United States Patent [19]
Rody et al.

[11] 3,893,973
[45] July 8, 1975

[54] MANGANESE-(II)SALTS OF PHOSPHONIC ACID HALF-ESTERS, POLYAMIDE STABILIZERS

[75] Inventors: Jean Rody, Basel; Paul Moser, Riehen, both of Switzerland

[73] Assignee: Ciba-Geigy Corporation, Ardsley, N.Y.

[22] Filed: Feb. 7, 1974

[21] Appl. No.: 440,635

Related U.S. Application Data

[62] Division of Ser. No. 282,636, Aug. 21, 1972, Pat. No. 3,839,380.

[30] Foreign Application Priority Data
Sept. 30, 1971 Switzerland.................... 14210/71

[52] U.S. Cl............................................ 260/45.75 R
[51] Int. Cl............................................ C08g 51/62
[58] Field of Search....................... 260/45.75 R, 78

[56] References Cited
UNITED STATES PATENTS

| | | | |
|---|---|---|---|
| 3,310,575 | 3/1967 | Spwack.............................. | 260/45.7 |
| 3,501,442 | 3/1970 | Burrows et al...................... | 260/78 |
| 3,594,346 | 7/1971 | Herman et al..................... | 260/45.7 |
| 3,763,113 | 10/1973 | Burrows et al....................... | 260/78 |
| 3,767,735 | 3/1971 | Fenyes et al...................... | 260/45.7 |

*Primary Examiner*—V. P. Hoke
*Attorney, Agent, or Firm*—Charles W. Vanecek; Nestor W. Shust

[57] ABSTRACT

New manganese-(II) salts of phosphonic acid half-esters are used as stabilisers for polyamides. The new compounds are manufactured from the corresponding sodium salts of the phosphonic acid half-esters and a manganese-(II) salt.

16 Claims, No Drawings

MANGANESE-(II) SALTS OF PHOSPHONIC ACID HALF-ESTERS, POLYAMIDE STABILIZERS

This application is a divisional application of U.S. Application Ser. No. 282,636, filed on Aug. 21, 1972, now U.S. Pat. No. 3,839,380.

The subject of the invention are new manganese-(II) salts of phosphonic acid half-esters, their manufacture, their use for protecting polyamides and, as an industrial product, the organic material protected, with the aid of these salts, against the harmful influence of light.

It is known to employ manganese salts as light stabilisers for polyamides, especially for polyamides delustred with titanium dioxide. The salts concerned are the salts of the divalent manganese cation with anions of organic acids, for example acetate, oxalate, lactate and benzoate. They are added to the carrier material together with acids of phosphorus, either in the form of the corresponding sodium salts or as free acids or as their esters, such as sodium hexametaphosphate, phosphorous acid, phenylphosphonic acid or esters thereof, before, during or after the polymerisation or polycondensation. However, these light-stabilised mixtures suffer from the disadvantage that they can partially be eluted by aqueous media, which manifests itself in a decrease in the light protection action above all after dyeing thin polymer structures, for example fibres, in aqueous liquors. The same disadvantage is also shown by phosphorus-free polyamide fibres stabilised with manganese salts of organic acids, such as manganese acetate, alone.

It has now been found, surprisingly, that new compounds of the formula I

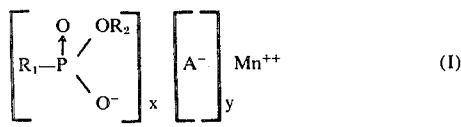

in which $R_1$ denotes alkyl with 1 to 18 carbon atoms, cyclohexyl, aryl with 6 to 10 carbon atoms which is unsubstituted or substituted by 1 or 2 methyl groups or aralkyl with 7 to 11 carbon atoms, $A^-$ denotes the anion of an aliphatic carboxylic acid with 1 to 18 carbon atoms or of an aromatic carboxylic acid with 7 to 11 carbon atoms or the chloride, bromide or iodide anion, $x$ denotes 1 or 2, $y$ denotes 0 or 1, with $x + y$ being 2, and $R_2$ denotes alkyl with 1 to 18 carbon atoms, are very good light stabilisers for polyamides.

As compared to the previously known manganese salts or their mixtures with phosphorus compounds, the compounds according to the invention show a distinctly improved action as light stabilisers and furthermore have the industrially desired advantage of a substantially lower ease of elution from the polyamide by aqueous media. As compared to other previously known light protection agents for polyamides from the series of the salts or complexes of hydroxybenzylphosphonic acid half-esters with various other metal ions, the compounds according to the invention show a far better light protection action and substantially more favourable colour properties.

$R_1$ and $R_2$ in the formula I denote, for example, methyl, ethyl, n-propyl, iso-propyl, butyl, pentyl, hexyl, octyl, iso-octyl, decyl, dodecyl, tetradecyl or octadecyl.

$R_1$ is preferably alkyl with 1 to 12 carbon atoms and particularly preferably alkyl with 2 to 12 and with 3 to 12 carbon atoms.

$R_2$ is preferably alkyl with 2-18 carbon atoms such as methyl, ethyl, propyl, butyl or octyl. Methyl, ethyl or butyl are particularly preferred.

Aryl in the formula I denotes, for example, phenyl or naphthyl and aralkyl can denote benzyl, 2-phenylethyl or naphthylmethyl.

The anion $A^-$ in the formula I can be the anion of an aliphatic carboxylic acid with 1 to 18 carbon atoms, for example the anion of formic acid, acetic acid, propionic acid, butyric acid, 2-ethyl-hexanoic acid, lauric acid and stearic acid.

The anion $A^-$ can, however, also be the anion of an aromatic carboxylic acid with 7 to 11 carbon atoms, for example the anion of benzoic acid, of a toluic acid, of phenylacetic acid or of butylbenzoic acid.

Anions of aliphatic carboxylic acids with 2 to 8 carbon atoms, for example the acetate ion, or anions of aromatic carboxylic acids with 7 or 8 carbon atoms, for example the benzoate ion, are preferred as $A^-$.

Possible carrier materials for the new compounds are polyamides and copolyamides which are obtained by polymerisation of diamines and dicarboxylic acids and/or of aminocarboxylic acids or the corresponding lactams. The substrates can be in the form of filaments, bristles, films, injection-moulded articles and the like.

The compounds of the formula I are added to the carrier materials in an amount which corresponds to 1.0 to 500 ppm of manganese, relative to the carrier material. Manganese additions of 10 to 200 ppm relative to the carrier material are preferred, and those of 10 to 70 ppm are particularly preferred.

The new compounds can be incorporated into the polyamides before, during or after polycondensation, optionally conjointly with further additives. Possible further additives are: pigments, maninly titanium dioxide in its two modifications rutile and anatase, in concentrations of 0.01-3.0%, but also coloured pigments such as cadmium sulphides, phthalocyanines, and perylene pigments; chain regulators, for example acetic acid and benzoic acid; phenolic anti-oxidants or amine antioxidants such as 1,3,5-trimethyl-2,4,6-tri-(3,5-di-tert.-butyl-4-hydroxy-benzyl)-benzene, pentaerythritol-[3-(4-hydroxy-3,5-di-tert.-butylphenyl)-propionic acid]-tetraester, 1,6-hexamethylene-[3-(4-hydroxy-3,5-ditert.-butylphenyl)-propionic acid]-diamide, 4,4'-butylidenebis(3-methyl-6-tert.butylphenol) and ditert.-octyl-diphenylamine; UV-absorbers which are preferably incorporated into the polymer after the polycondensation, for example 2-(2'-hydroxy-3',5'-di-tert.-amyl-phenyl)-benzotriazole and 2-(2'-hydroxy-5'-methyl-phenyl)-benzotriazole; further additives, such as antistatic agents and flameproofing agents.

The new compounds can also be added to the finished polyamide before or during shaping, for example by sprinkling ("dry blending") onto dried granules or by applying a solution of the compounds according to the invention, and optionally further additives, to the polyamide and subsequently evaporating the solvent.

Various processes are suitable for the manufacture of the compounds of the formula I. Thus, for example, 1 or 2 mols of a compound of the formula II

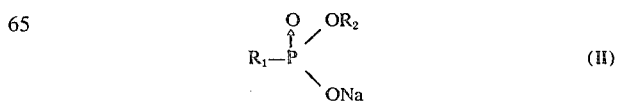

in which $R_1$ and $R_2$ have the meanings indicated under the formula I, can be reacted with 1 mol of a compound of the formula III $$Mn^{++}(A^-)_2 \quad (III)$$

wherein $A^-$ has the meaning indicated under the formula I.

It is, however, also possible to react 2 mols of a phosphonic acid half-ester of the formula IIa

(IIa)

wherein $R_1$ and $R_2$ have the meanings indicated under the formula I, with 1 mol of manganese-(II) carbonate or manganese-(II) hydroxide.

Suitable solvents for these reactions are above all water, alcohols, especially methanol, ethanol and isopropanol, ethylene glycol monomethyl ether, ethylene glycol monoethyl ether, dioxane, tetrahydrofurane, acetonitrile and mixtures of these solvents.

Since the manganese-(II) ion is easily oxidised, the reactions are advantageously carried out in an inert gas atmosphere, which can consist, for example, of nitrogen.

Since the manufacturing processes described are equilibrium reactions, the compounds formed are often obtained as mixtures which in addition to the desired compounds of the formula I contain further compounds which are in equilibrium with these in the particular reaction medium.

Such mixtures obtained by the manufacturing processes described are also suitable for use as light stabilisers for polyamides.

The invention is described in more detail in the examples which follow.

EXAMPLES 1 TO 3

(compare Table I)

0.1 mol of the phosphonic acid half-esters of Column 2, isolated as sodium salts, and 9.90 g (0.05 mol) of manganese-(II) chloride tetrahydrate are dissolved in 400 ml of boiling ethanol. Hereupon, sodium chloride precipitates and is filtered off. In the case of Example 3, the manganese salt of the half-ester also partially precipitates at the same time. Here, removal of the sodium chloride is dispensed with and the process is continued with the suspension. The filtrate or the resulting suspension is evaporated to dryness and the residue is extracted with the solvents mentioned in Column 3. The evaporated extract is subsequently subjected to the further purification described in Column 4 and is thereafter dried for 8 hours at a temperature of 60°C and a pressure of 11 mm Hg. Following this instruction, the manganese-(II) salts mentioned in Column 5 are obtained, the properties of which are described in Columns 9 to 10.

Table I

| 1 | 2 | 3 | 4 | 5 | 6 | 7 | 8 | 9 | 10 |
|---|---|---|---|---|---|---|---|---|---|
| Example No. | Starting product | Extractant | Additional purification operation | End product Mn (II)- | Content % P | Mn | Properties The substance is soluble in (h = at the boil, c = at room temperature) | Colour consistency | Melting point (°C) |
| 1 |  | Ethanol | Solution in methylene chloride and precipitation with ether | Bis-(O-ethyl-ethyl-phosphonate) | 18.2 | 16.6 | Water (c) Ethanol (c) Ligroin (h) | Pale pink powder | 79–80° |
| 2 | CH$_3$ O<br>CH—P—ONa<br>CH$_3$ OC$_2$H$_5$ | Chloroform | Extraction with acetone | Bis-(O-ethyl-isopropyl phosphonate) | 17.4 | 15.3 | Water (c) Ethanol (h) Toluene (h) | White powder | >340° (Decomposition) |
| 3 | (C$_6$H$_{11}$)—P(=O)(—ONa)(OC$_4$H$_9$) | Chloroform | Extraction with absolute ethanol | Bis-(O-n-butylcyclohexyl-phosphonate) | 13.2 | 11.2 | Ethanol (c) Chloroform (c) Toluene (h) | Pale beige powder | >250° (Decomposition) |

EXAMPLES 4 TO 10

(compare Table II)

0.1 mol of the phosphonic acid half-esters of Column 2, isolated as sodium salts, are dissolved in the type and amount of solvent indicated in Column 3 and a solution of 10.2 g (0.0515 mol) of manganese-(II) chloride tetrahydrate in 50 ml of the same solvent is added dropwise at 25° to 30°C. The precipitate thereby produced is filtered off and eluted with the solvent mentioned until no further chloride ions are detectable in the filtrate. (Example 5 behaves differently in this working-up stage. On adding the manganese salt, an emulsion precipitates instead of a solid precipitate, and this emulsion is extracted with ether. After drying this solution with sodium sulphate, the ether is evaporated off and the residue is further worked up as shown in the Table). The crude manganese-(II) salts isolated in this way are in some cases subjected to a further purification described in Column 4. Thereafter the products are dried for 8 hours at 60°C and a pressure of 11 mm Hg. Following this instruction, the manganese-(II) salts mentioned in Column 5 are obtained, the properties of which are described in Columns 6 to 10.

Table II

| Ex. No. | Starting product | Solvent amount in ( ) | Additional purification operation | End product Mn (II)- | Content % P | Content % Mn | Properties The substance is soluble in (h = at the boil, c = at room temperature) | Colour consistency | Melting point (°C) |
|---|---|---|---|---|---|---|---|---|---|
| 4 | $C_8H_{17}\overset{O}{\underset{OC_2H_5}{\overset{\|}{P}}}-ONa$ | Water (70 ml) | None | Bis-(O-ethyl-n-octyl-phosphonate) | | 11.1 | Dimethylformamide (c) Chloroform (c) | Pale pink powder | |
| 5 | $CH_3(CH_2)_3\overset{C_2H_5}{\underset{OC_4H_9}{\overset{\|}{CH-P-ONa}}}$ | Water (300 ml) | Extraction with ethanol at room temperature | Bis-(O-n-butyl-2-ethylhexyl-phosphonate) | | 9.9 | Chloroform (c) Ligroin (c) | White mass | |
| 6 | $C_{12}H_{25}\overset{O}{\underset{OC_2H_5}{\overset{\|}{P}-ONa}}$ | Water (70 ml) | Recrystallisation from ethanol | Bis-(O-ethyl-n-dodecyl-phosphonate) | 10.2 | 9.2 | Water (h) Chloroform (h) Ligroin (h) | Pale pink powder | 76–77° |
| 7 | $C_{18}H_{37}\overset{O}{\underset{OC_4H_9}{\overset{\|}{P}-ONa}}$ | 10% strength ethanol (120 ml) | None | Bis-(O-n-butyl-octadecyl-phosphonate) | | 6.65 | Dimethylformamide (h) Ethanol (h) Ligroin (h) | White powder | 98–99° |
| 8 | Phenyl-$\overset{O}{\underset{OC_{18}H_{37}}{\overset{\|}{P}-ONa}}$ | 20% strength ethanol (150 ml) | None | Bis-(O-n-octadecyl-phenyl-phosphonate) | | 6.3 | Dimethylformamide (h) Toluene (c) | Pale pink powder | 118–120° |
| 9 | Phenyl-$CH_2-\overset{O}{\underset{OC_2H_5}{\overset{\|}{P}-ONa}}$ | Water (150 ml) | None | Bis-(O-ethyl-benzyl-phosphonate) | | 10.9 | Dimethylformamide (h) | Pale pink powder | 200–204° |
| 10 | Naphthyl-$CH_2-\overset{O}{\underset{OC_2H_5}{\overset{\|}{P}-ONa}}$ | Ethanol (470 ml) | None | Bis-(O-ethyl-α-naphthyl-phosphonate) | 11.1 | 10.0 | Dimethylformamide (h) | White powder | 228–229° |

EXAMPLE 11

50 ppm of Mn, as Mn phosphonate from Example 1, 2, 6, 8 or 9, are sprinkled dry onto dried polyamide-6 granules delustred with 1.8% of $TiO_2$ (anatase) and the sprinkle-coated mixture was spun by means of extruders into 20 den monofilaments which were subsequently stretched.

For the comparison formulation, the amount of Mn-II acetate corresponding to 50 ppm of Mn was dissolved in water and this solution was uniformly dried onto highly delustred polyamide-6 granules (1.8% of $TiO_2$). The dry sprinklecoated mixture was then also spun by means of extruders to give 20 den monofilaments which were stretched.

As a further comparison, 20 den monofilament silk delustred with 1.8% of $TiO_2$, but free of Mn, were also manufactured.

These 7 silk formulations were exposed on a white cardboard background, free of tension, in the Xenotest 450, and the mechanical strengths were determined after 500, 1,000, 1,500 and 2,000 hours exposure time. For the data obtained, see Table III.

Table III

| Additives | % residual tenacity after hours (hrs.) Exposure time | | | |
|---|---|---|---|---|
| | 500 (hrs) | 1000 (hrs) | 1500 (hrs) | 2000 (hrs) |
| 1) without Mn | 20% | — | — | — |
| 2) 50 ppm of Mn as Mn phosphonate from Example 1 | 90% | 80% | 70% | 60% |
| 3) 50 ppm of Mn as Mn phosphonate from Example 2 | 85% | 85% | 70% | 65% |
| 4) 50 ppm of Mn as Mn phosphonate from Example 6 | 85% | 75% | 65% | 55% |
| 5) 50 ppm of Mn as Mn phosphonate from Example 8 | 85% | 70% | 60% | 50% |
| 6) 50 ppm of Mn as Mn phosphonate from Example 9 | 95% | 85% | 75% | 65% |
| 7) 50 ppm of Mn as Mn-II acetate | 80% | 65% | 40% | — |

We claim:

1. A composition containing a polyamide and a stabilizing amount of a compound of the formula I

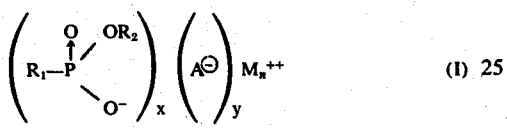 (I)

wherein
R$_1$ is selected from the group consisting of alkyl with 1 to 18 carbon atoms, cyclohexyl, aryl with 6 to 10 carbon atoms which is unsubstituted or substituted by 1 or 2 methyl groups, and aralkyl with 7 to 11 carbon atoms;
A$^-$ is selected from the group consisting of an anion of an aliphatic carboxylic acid with 1 to 18 carbon atoms, an anion of an aromatic carboxylic acid with 7 to 11 carbon atoms, and the chloride, bromide, and iodide anion;
$x$ is 1 or 2,
$y$ is 0 or 1, with $x+y$ being 2, and
R$_2$ is alkyl with 1 to 18 carbon atoms.

2. A composition of claim 1, wherein R$_1$ is selected from the group consisting of alkyl with 1 to 18 carbon atoms, cyclohexyl, phenyl, benzyl and naphthylmethyl.

3. A composition of claim 1, wherein R$_1$ is selected from the group consisting of alkyl with 1 to 12 carbon atoms, phenyl and benzyl.

4. A composition of claim 1, wherein R$_1$ is selected from the group consisting of alkyl with 2 to 12 carbon atoms, phenyl and benzyl and R$_2$ is alkyl with 2 to 18 carbon atoms.

5. A composition of claim 1 wherein R$_1$ is selected from the group consisting of alkyl with 3 to 12 carbon atoms and benzyl.

6. A composition of claim 1, wherein A$^-$ is selected from the group consising of the anion of an aliphatic carboxylic acid with 2 to 8 carbon atoms, the anion of an aromatic carboxylic acid with 7 to 8 carbon atoms, the chloride, bromide and iodide anion and R$_2$ is selected from the group consisting methyl, ethyl, propyl, butyl and octyl.

7. A composition of claim 1, wherein A$^-$ is selected from the group consisting of the anion of acetic acid, the anion of stearic acid, the chloride anion, and the iodide anion, and R$_2$ is selected from the group consisting of methyl, ethyl and butyl.

8. A composition of claim 1, wherein $x$ is 2 and $y$ is 0.

9. A process for stabilizing polyamides, wherein a stabilizing amount of a compound of the formula I

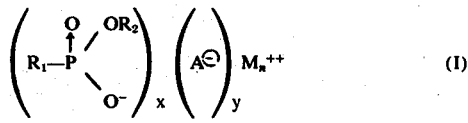 (I)

wherein
R$_1$ is selected from the group consisting of alkyl with 1 to 18 carbon atoms, cyclohexyl, aryl with 6 to 10 carbon atoms which is unsubstituted or substituted by 1 or 2 methyl groups, and aralkyl with 7 to 11 carbon atoms;
A$^-$ is selected from the group consisting of an anion of an aliphatic carboxylic acid with 1 to 18 carbon atoms, an anion of an aromatic carboxylic acid with 7 to 11 carbon atoms, and the chloride, bromide, and iodide anion;
$x$ is 1 or 2,
$y$ is 0 or 1, with $x+y$ being 2, and
R$_2$ is alkyl with 1 to 18 carbon atoms, is incorporated.

10. A process of claim 9, wherein R$_1$ is selected from the group consisting of alkyl with 1 to 18 carbon atoms, cyclohexyl, phenyl, benzyl and naphthylmethyl.

11. A process of claim 9, wherein R$_1$ is selected from the group consisting of alkyl with 1 to 12 carbon atoms, phenyl and benzyl.

12. A process of claim 9, wherein R$_1$ is selected from the group consisting of alkyl with 2 to 12 carbon atoms, phenyl and benzyl and R$_2$ is alkyl with 2 to 18 carbon atoms.

13. A process of claim 9, wherein R$_1$ is selected from the group consisting of alkyl with 3 to 12 carbon atoms and benzyl.

14. A process of claim 9, wherein A$^-$ is selected from the group consisting of the anion of an aliphatic carboxylic acid with 2 to 8 carbon atoms, the anion of an aromatic carboxylic acid with 7 to 8 carbon atoms, the chloride, bromide and iodide anion and R$_2$ is selected from the group consisting of methyl, ethyl, propyl, butyl, and octyl.

15. A process of claim 9, wherein A$^-$ is selected from the group consisting of the anion of acetic acid, the anion of stearic acid, the chloride anion, and the iodide anion, and R$_2$ is selected from the group consisting of methyl, ethyl, and butyl.

16. A process of claim 9, wherein $x$ is 2 and $y$ is 0.

* * * * *